US007624560B1

(12) United States Patent
Humphrey

(10) Patent No.: US 7,624,560 B1

(45) Date of Patent: Dec. 1, 2009

(54) DEPTH/HEIGHT ADJUSTER FOR A GRASS TREATMENT INSERT

(76) Inventor: John L. Humphrey, 327 Willowpointe Dr., St. Charles, MO (US) 63304

(*) Notice: Subject to any disclaimer, the term of this patent is extended or adjusted under 35 U.S.C. 154(b) by 0 days.

(21) Appl. No.: 12/246,960

(22) Filed: Oct. 7, 2008

(51) Int. Cl.
*A01D 34/00* (2006.01)

(52) U.S. Cl. ........................................ 56/17.2

(58) Field of Classification Search .................. 56/17.1, 56/17.2, 249, 16.9, 198
See application file for complete search history.

(56) References Cited

U.S. PATENT DOCUMENTS

| | | | | |
|---|---|---|---|---|
| 2,507,758 | A * | 5/1950 | Daggett | 56/15.3 |
| 2,968,906 | A * | 1/1961 | Grimes | 56/249 |
| 3,099,124 | A * | 7/1963 | Strasel | 56/249 |
| 3,217,479 | A * | 11/1965 | Robinson et al. | 56/254 |
| 3,423,919 | A * | 1/1969 | De Poy Cook | 56/249 |
| 3,628,318 | A * | 12/1971 | Grobowski | 56/249 |
| 3,918,239 | A * | 11/1975 | Aldred et al. | 56/7 |
| 4,481,757 | A * | 11/1984 | Tsuchiya | 56/16.9 |
| 4,947,630 | A * | 8/1990 | Rich et al. | 56/249 |
| 5,203,151 | A * | 4/1993 | Mills | 56/17.2 |
| 5,228,277 | A * | 7/1993 | Smith et al. | 56/16.9 |
| 5,241,810 | A * | 9/1993 | Reichen | 56/249 |
| 5,511,365 | A * | 4/1996 | Rice | 56/7 |
| 5,553,380 | A * | 9/1996 | Rice | 29/895.2 |
| 6,082,086 | A * | 7/2000 | Togoshi et al. | 56/199 |
| 6,622,464 | B2 * | 9/2003 | Goman et al. | 56/16.9 |
| 6,647,703 | B2 | 11/2003 | Oliver | |
| 6,651,415 | B2 * | 11/2003 | Burke | 56/17.2 |
| D485,850 | S | 1/2004 | Anderson | |
| 6,732,500 | B1 * | 5/2004 | Myers | 56/17.2 |
| D498,484 | S | 11/2004 | Anderson | |
| D499,434 | S | 12/2004 | Anderson | |
| 6,945,021 | B2 | 9/2005 | Michel | |
| 7,395,648 | B1 * | 7/2008 | Silbernagel et al. | 56/17.2 |
| 2003/0140611 | A1 * | 7/2003 | Burke | 56/17.2 |

FOREIGN PATENT DOCUMENTS

| | | |
|---|---|---|
| GB | 2350998 A | 12/2000 |
| WO | 2007/085820 A1 | 8/2007 |

* cited by examiner

*Primary Examiner*—Árpád Fábián-Kovács
(74) *Attorney, Agent, or Firm*—Grace J. Fishel

(57) ABSTRACT

A depth of cut/height adjuster for a grass treatment insert mounted to rotate in a frame supported on front and rear rollers. The adjuster permits an operator to vary the height of a frame relative to the front roller and thereby adjust the depth of cut of the grass treatment insert. The depth/height adjuster includes a frame mount block for attachment to the frame. The frame mounting block has a throughbore in which is threaded a shaft. A roller mounting block for attachment to the front roller is rotatably mounted on a lower end of the shaft. A vertical gauge attached to the roller mounting block when aligned with a marker on the frame mounting block (such as the bottom edge) indicates the relative distance between the roller mounting block and frame mounting block which is correlated with a height setting of the grass treatment insert.

8 Claims, 5 Drawing Sheets

10
54
58
56
50
36
44
34
90
86
88
60
78
68
30
40
38
42
80
76
72
74
70

28
20
80
68
94
24
54
10
30
22
92
18
10
26
12
30
94
68

DEPTH/HEIGHT ADJUSTER FOR A GRASS TREATMENT INSERT

BACKGROUND OF THE INVENTION

1. Field of the Invention

The present invention relates to a depth/height adjuster for a grass treatment insert mounted in a grass treatment unit for use on a mowing machine.

2. Brief Description of the Prior Art

Several manufacturers offer grass treatment units which are designed to fit existing greensmowers. Grass treatment inserts for use in grass treatment units are provided to accomplish various greens grooming practices, including vibratory and non-vibratory rolling, verticutting, scarifying, grooming, spiking, slitting, slicing, brushing and the like.

Typically, each grass treatment insert is mounted in a frame which is supported on front and rear rollers. The front roller is adjustably mounted on the frame so as to set the height of the grass treatment insert above the ground. As a starting reference point, a zero setting occurs when the tips of the grass treatment insert are in the plane of the front and rear rollers. This may be determined by turning the grass treatment unit upside down, laying a straight edge across the rollers and moving the height adjuster up or down until the tips of the grass treatment insert are in the plane.

A positive cut occurs when the blade tips are above the plane of the rollers and a negative cut occurs when the blade tips are below the plane of the rollers. Both settings are desirable under some circumstances depending on the condition of the grass and the practice to be applied.

The diameter of the grass treatment inserts typically differs between practices, e.g., scarifying and verticutting. It is therefore necessary to establish the zero reference point each time the insert is changed. This requires removing the grass treatment unit from the mower, turning it upside down on a bench, etc.

BRIEF SUMMARY OF THE INVENTION

In view of the above, it is an object of the present invention to provide a depth/height adjuster for a grass treatment insert which does not require removal of the grass treatment unit from the mowing machine to set the zero reference point for the grass treatment insert. It is another object to provide a vertical height gauge on the depth/height adjuster with a marking which is calibrated to indicate the zero reference point for a particular grass treatment insert. Another object is to provide a depth/height adjuster which may be used to adjust the cut of the grass treatment insert above or below the zero reference point by a series of "clicks" which be may heard and/or felt.

Other objects and features of the invention will be in part apparent and in part pointed out hereinafter.

In accordance with the invention, a depth/height adjuster is provided for a grass treatment insert. The depth/height adjuster is for use on a grass treatment unit which includes a frame which is supported on front and rear rollers and within which the grass treatment insert is rotatably mounted. The depth/height adjuster is adjustable to vary the distance between the frame relative to the front roller and thereby adjust the height setting of the grass treatment insert.

The depth/height adjuster in major part includes:

(1) A frame mounting block which is adapted to be mounted on a left or right side of the frame of a grass treatment unit. The frame mounting block has a throughbore, an upper end of which is threaded.

(2) A shaft with an upper end which is threadedly received in the threaded throughbore of the frame mounting block.

(3) A roller mounting block which is rotatably mounted on a lower end of the shaft. Free rotation of the shaft in the roller mounting block and threaded rotation of the shaft in the throughbore effects the relative distance between the frame mounting block and the roller mounting block.

(4) A vertical height gauge which is attached to the roller mounting block. The vertical height gauge has markings which when aligned with a marker on the frame mounting block indicates the relative distance between the roller mounting block and frame mounting block. This relative distance is correlated by the height adjuster with the height setting of the grass treatment insert with respect to the plane of the front and rear rollers.

A marking is provided on the vertical height gauge to indicate a zero reference point for a selected grass treatment insert. The zero reference point being that distance where the outer periphery (i.e., the tips) of the grass treatment insert are in the plane of the front and rear rollers. When multiple markings are provided, the vertical height gauge may indicate the zero reference point for different grass treatment inserts.

The depth/height adjuster may be further outfitted with a spring biased detent which through a series of "clicks" indicates the distance that the grass treatment insert has been moved above or below the zero reference point without the need to consult the vertical height gauge.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which.

DETAILED DESCRIPTION OF THE INVENTION

Figure 1:
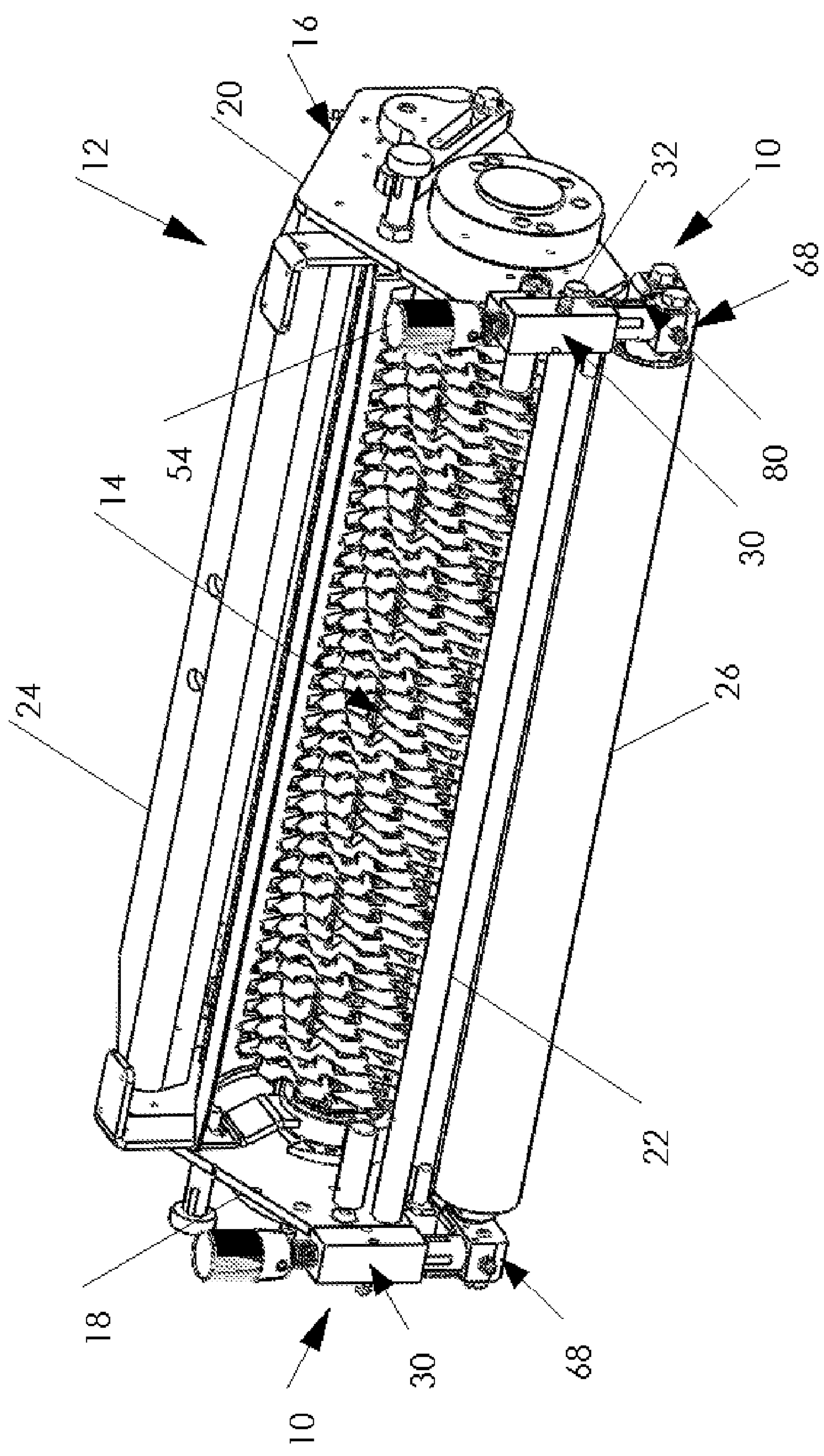
FIG. 1 is a perspective view of a grass treatment unit with a grass treatment insert for verticutting, the frame of the grass treatment unit is supported on depth/height adjusters in accordance with the present invention.
Figure 2:
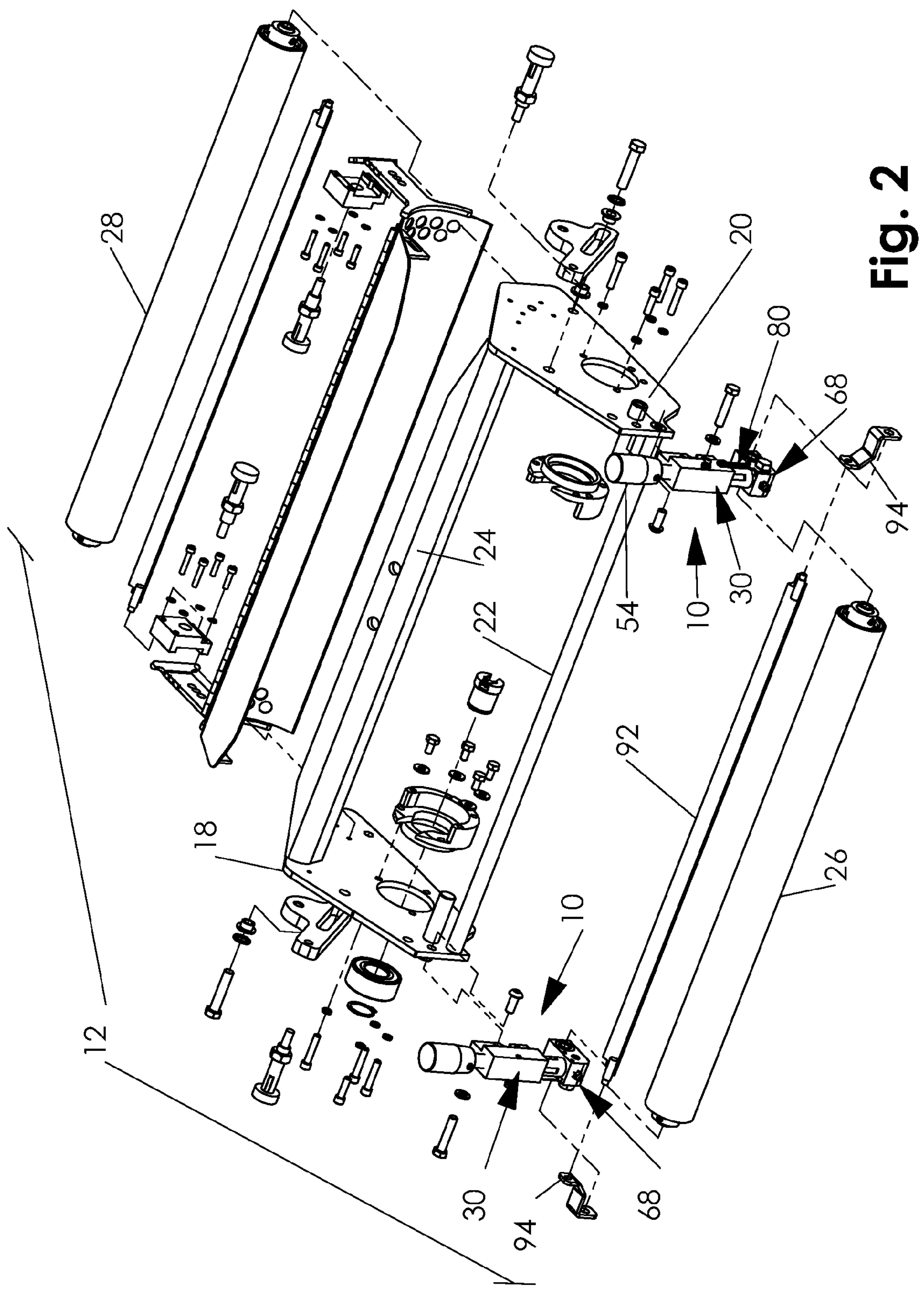
FIG. 2 is an exploded view of the grass treatment unit from which the depth/height adjusters are shown removed.
Figure 3:
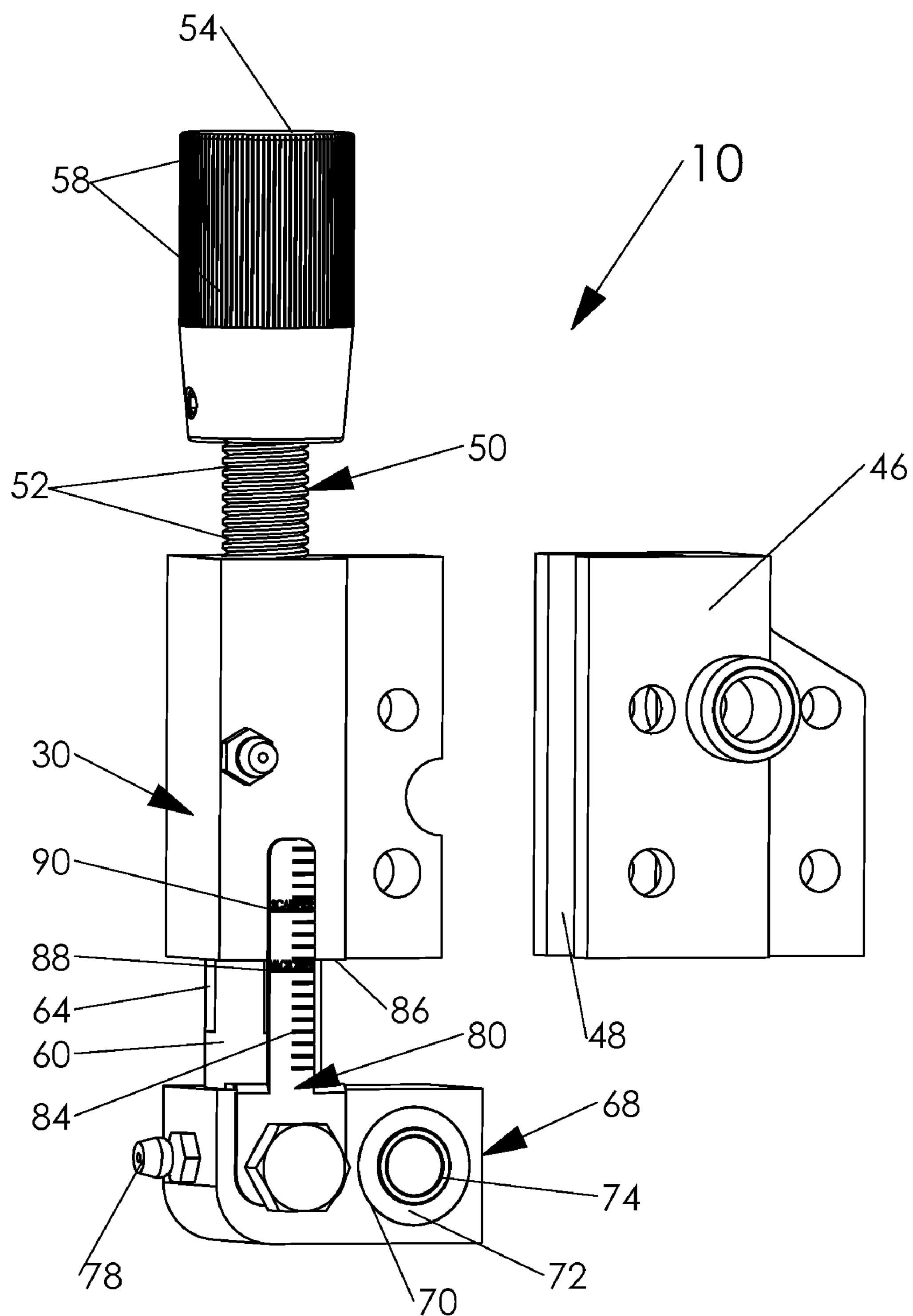
FIG. 3 is a perspective view the depth/height adjuster shown removed from the right side of the grass treatment unit, shown with an adapter block for mounting the depth/height adjuster on a different grass treatment unit.
Figure 4:
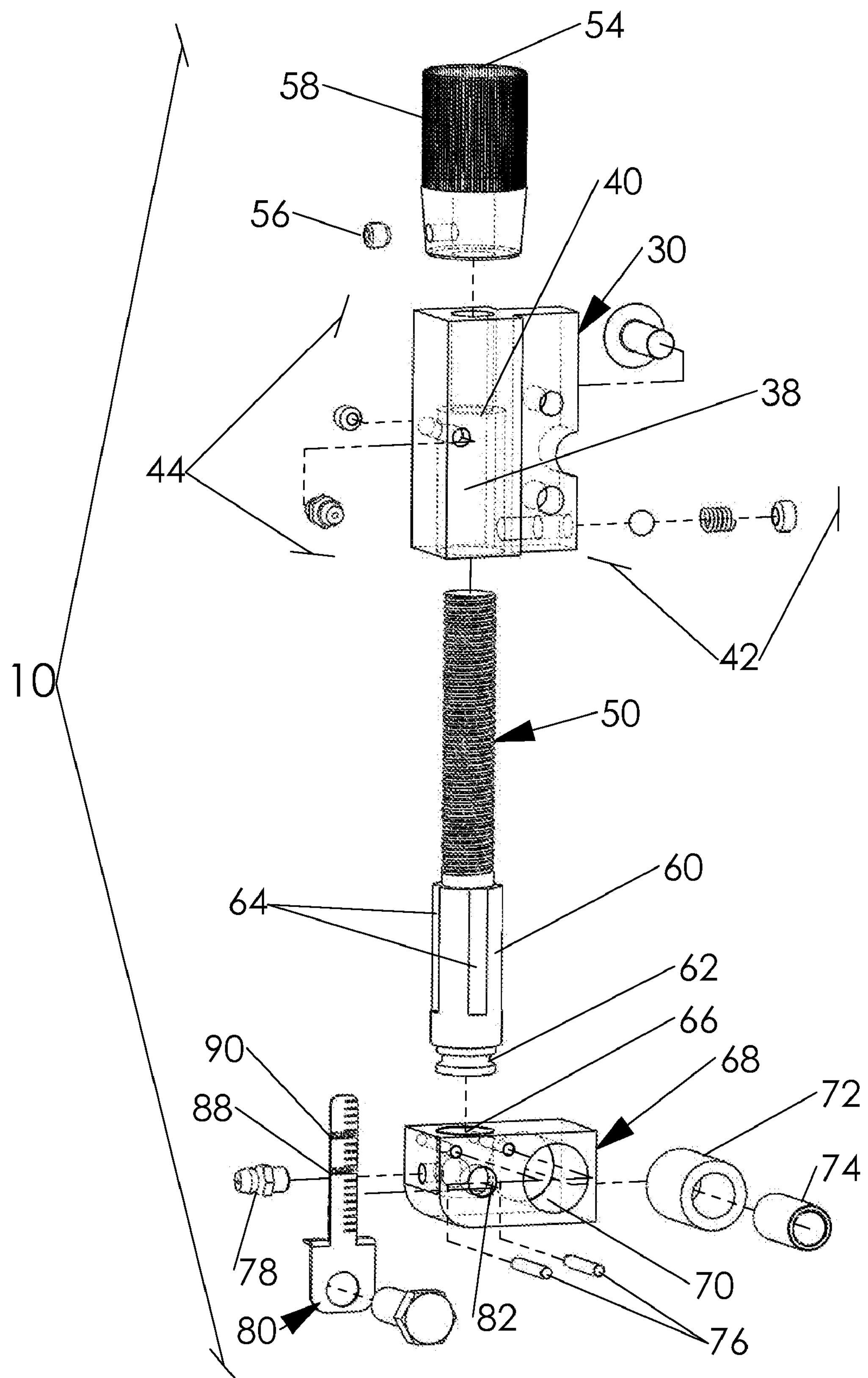
FIG. 4 is an exploded view of the depth/height adjuster.
Figure 5:
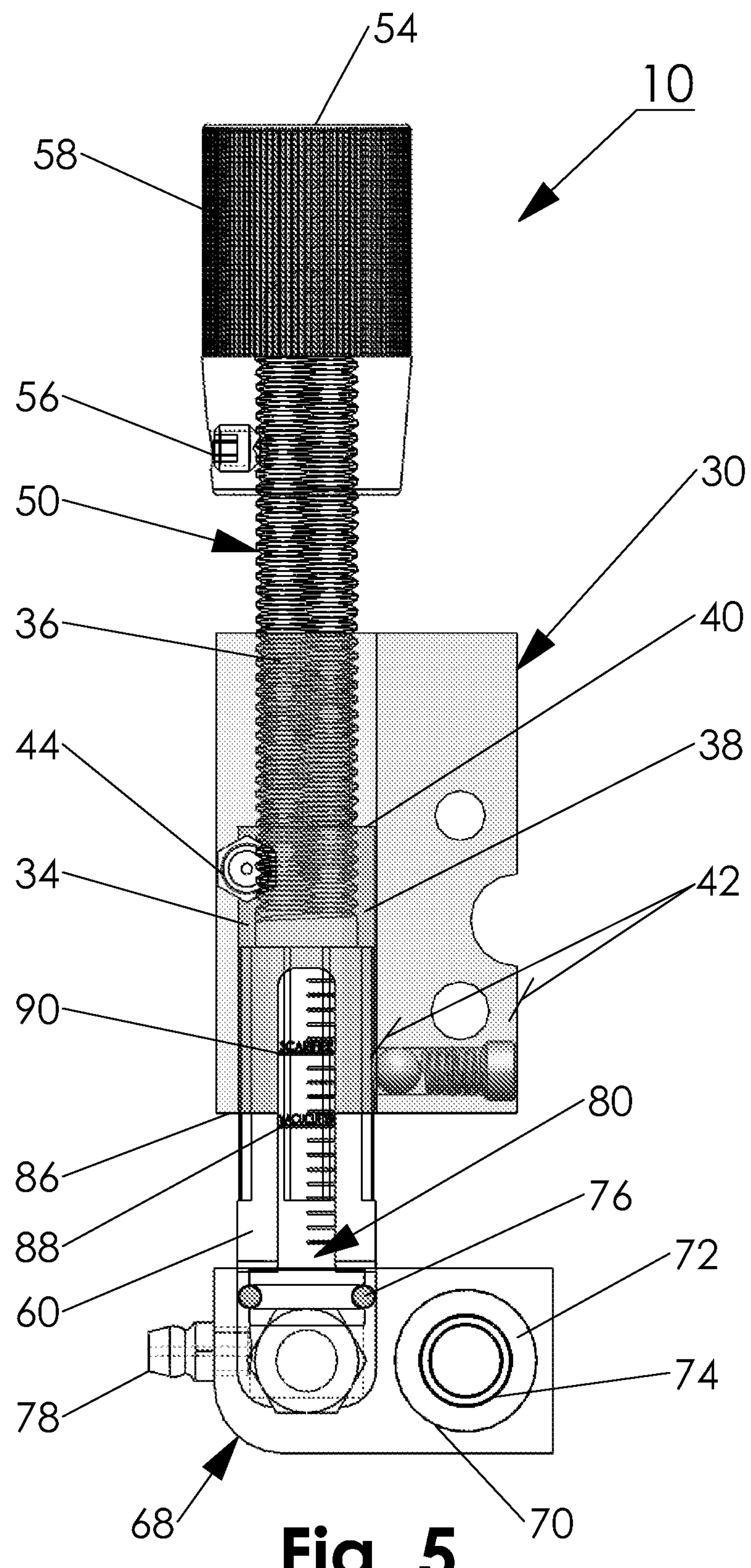
FIG. 5 is x-ray view of the depth/height adjuster.

Referring to the drawings more particularly by reference character, as best seen in FIGS. 3-5, reference number 10 refers to a depth/height adjuster in accordance with the present invention. Depth/height adjuster 10 is adapted for use on a grass treatment unit 12 as shown in FIG. 1 in conjunction with a grass treatment insert 14, the particular one illustrated being for verticutting. Grass treatment unit 12 includes a frame 16 with right and left sidewalls 18, 20 joined by cross-members 22, 24 within which is rotatably mounted grass treatment insert 14. Frame 16 is supported on front and rear rollers 26, 28.

With continuing reference to FIGS. 3-5, depth/height adjuster 10 includes a frame mounting block 30 which may be attached to either the right or left sidewall 18, with bolts 32 (FIG. 1). For this purpose, a rear edge of frame mounting block 30 is T-shaped. Frame mounting block 30 has a throughbore 34, an upper portion of which is threaded 36. In the form illustrated, a lower portion of throughbore 34 is widened to form a socket 38 with a flat top 40 together with a spring biased detent 42 such as a spring ball plunger. A grease fitting 44 such as a zerk fitting may also be provided in throughbore 34 for lubricating threads 36 and for purging dirt from the assembly. For use on other grass treatment units 12 (e.g., John Deere instead of Jacobsen), an adapter block 46 such as shown in FIG. 3 may be provided. Adapter block 46 includes a vertical groove 48 for receipt of the T-portion of frame mounting block 30. Adapter block 46 like frame mounting block 30 may have a rear edge that is T-shaped such it may be bolted on the right or left side of frame 16.

A shaft 50 with a threaded upper end 52 is threadedly received in threads 36 of throughbore 34 with a portion of the threaded shaft extending through and above frame mounting block 30. A nut 54 is threaded on shaft 50 and locked thereon with a set screw 56. Nut 54 may include vertical grooves 58, knurling or the like to make it easier to hand rotate nut 54 which serves as a handle for rotating shaft 50 as more particularly described below.

Shaft 50 has an enlarged lower end 60 terminating in a circumferential groove 62 (FIG. 4). Enlarged lower end 60 has a plurality of vertical grooves 64, illustrated as four equally spaced grooves, and a circumference such that it may be slidingly received in socket 38 of frame mounting block 30. Spring biased detent 42 of frame mounting block 30 is received in grooves 64 and provides an audible and/or physical movement easily determined by an operator as shaft 50 is rotated with nut 54. Depth/height adjuster 10 is designed such that upper movement of shaft 50 is stopped when an upper end of enlarged lower end 60 contacts top 40 of socket 38. This prevents the operator from setting grass cutting insert 14 in a too positive cut. Depth/height adjuster 10 is also designed such that downward movement of shaft 50 is stopped when bottom edge of nut 54 contacts the top of frame mounting block 30. This prevents the operator from setting grass cutting insert 14 in a too negative cut.

Terminal end of shaft 50 with circumferential groove 62 is received in a socket 66 (FIG. 4) provided in a top face of a roller mounting block 68. A throughbore 70 is provided between the right and left sidewalls. Front roller 26 is journaled in throughbore 70, for which purpose throughbore 70 may be outfitted with a rubber isolator 72 and a steel sleeve 74. With the terminal end of shaft 50 seated in socket 66, a pair of spaced apart, parallel roll pins 76 or the like may be installed in roller mounting block 68 in a manner that they are received in groove 62. As best seen in FIG. 5, roll pins 76 connect shaft 50 to roller mounting block 68 in a manner that permits free rotation of shaft 50 therein. A grease fitting 78 such as a zerk fitting may be provided to lubricate groove 62, roll pins 76 and socket 66. Grease may also be used to purge the assembly of dirt.

A vertical height gauge 80 is bolted to right or left sidewall of roller mounting block 68 depending on whether depth/height adjuster 10 is installed on the right or left sidewall 18, 20. A threaded hole 82 (FIG. 4) is provided through roller mounting block 68 for that purpose. As best seen in FIG. 3, vertical height gauge 80 has a plurality of lateral markings 84 which as more particularly described below, lateral markings 84 may be used to indicate the relative distance between roller mounting block 68 and frame mounting block 30 when aligned with a marker 86 such as the bottom edge of frame mounting block.

More particularly, the spacing between lateral markings 84 may be arranged such that a marking 88 correlates with a zero reference point for a particular grass treatment insert 14 such as a verticutter whereas another marking 90 correlates with a zero reference setting for a scarifier, the scarifier having a larger diameter than the verticutter. For the purpose of establishing the zero reference point for other grass treatment inserts 14 (e.g., brushes, vibratory rollers, etc. made by a manufacturer) other vertical height gauges 80 with zero reference point markings may be provided.

Marking 88 is arranged on vertical height gauge 80 such that when grass treatment insert 14 is a verticutter, for example, and aligned with bottom edge 86 of frame mounting block 30, the tips of the verticutter are in the plane of front and rear rollers 26, 28. This is done without removing the grass treatment unit 12 from a mower, turning frame 16 upside down and laying a straight edge between front and rear rollers 26, 28 to establish the zero reference setting.

The alignment of marking 88 with bottom edge 86 is accomplished by rotating shaft 50 in frame mounting block 30 with nut 54. As shaft 50 is rotated, a clicking is heard and/or felt as spring biased detent 42 moves between grooves 64 in enlarged lower end 60 of shaft 50. With the dimensions (i.e., geometry) of frame 16 known, the pitch of threads 36, 52 may be selected such that one rotation of shaft 50 is correlated with a particular movement of grass treatment insert 14 with respect to the zero reference point, e.g. 0.040 inch. With this illustrative but non-limiting example, one "click" of nut 54 would result in 0.010 inch movement if there are four equally spaced vertical grooves 64. By keeping track of the number of "clicks" an operator can easily determine how much of a positive or negative cut he is making without looking at vertical height gauge 80. The facility with which the grass treatment unit may be dialed in by "clicks" also makes it easier for a greenskeeper to give instructions which are likely to be followed by an operator.

In use as shown in FIG. 1, frame mounting block 30 of one of depth/height adjusters 10 is bolted on the left side of frame 16 and frame mounting block 30 of a second of depth/height adjusters 10 is bolted on the right side of frame 16. When depth/height adjusters 10 are symmetrical on vertical centerline, as illustrated in the drawings, right and left depth/height adjusters 10 may be identical except for the placement of vertical height gauge 80 as described below. Front roller 26 is connected to roller mounting blocks 68 and a scraper 92 for front roller 26 may be suspended on brackets 94 between first and second roller mounting blocks 68.

A vertical height gauge 80 appropriate for the grass treatment insert 14 installed in grass treatment unit 12 is bolted on an outboard side of right and left roller mounting blocks 68. The shaft 50 of each depth/height adjuster 10 is rotated with nut 54 until a marking 84 (e.g., 88 or 90 in case of a verticutter or scarifier) appropriate for insert 14 is aligned with a marking on frame mounting block 30 such as bottom edge 86. This establishes the zero reference point for the insert where the tips of the insert are in the plane of front and rear rollers 26, 28.

If grass treatment unit 12 is used on a spongy green, front and rear rollers 26, 28 will settle into the turf and it may be necessary to raise grass treatment insert 14 such that the tips of the insert are above the plane of front and rear rollers 26, 28 resulting in a positive cut. This is accomplished with a few "clicks" of nut 54 counter clockwise. On the other hand, if a more aggressive treatment is required, a few "clicks" of nut 54 clockwise will place the tips of grass treatment insert 14 below the plane of front and rear rollers 26, 28 resulting in a negative cut. This adjustment may be made by feel without looking at vertical height gauge 80, although the alignment of markings 84 (e.g., 88 or 90) and 86 may be consulted to confirm the setting.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A depth/height adjuster for a grass treatment insert mounted to rotate in a frame supported on front and rear rollers, said depth/height adjuster adjustable to vary the distance between the frame relative to the front roller and thereby adjust the height setting of the grass treatment insert, said depth/height adjuster comprising:

a frame mounting block adapted to be mounted on a left or right side of the frame, said frame mounting block having a throughbore, an upper end of which is threaded and a lower end of which has a socket with a top wall, a shaft having an upper end which is threadedly received in the threaded throughbore of the frame mounting block and an enlarged lower end which is slidingly received in the socket, said shaft further having a nut affixed to an upper end of the shaft by which an operator may rotate the shaft, upward movement of the shaft in the frame mounting block being stopped when the upper end of the enlarged lower end contacts the top wall of the socket and downward movement of the shaft in the frame mounting block being stopped when a bottom edge of the nut contacts a top of the frame mounting block, a roller mounting block rotatably mounted on a lower end of the shaft, whereby free rotation of the shaft in the roller mounting block and threaded rotation of the shaft in the throughbore effects the relative distance between the frame mounting block and the roller mounting block, a vertical height gauge with scale markings attached to the roller mounting block, which scale markings of the vertical height gauge when aligned with a marking on the frame mounting block indicating the relative distance between the roller mounting block and frame mounting block which relative distance is correlated with a height setting of the grass treatment insert.

2. The depth/height adjuster of claim 1 wherein a marking on the scale of the vertical height gauge is provided to indicate a zero reference point for a selected grass treatment insert, said zero reference point being that distance where an outer periphery of the grass treatment insert mounted in a grass treatment unit is in the plane of the front and rear rollers.

3. The depth/height adjuster of claim 1 wherein a plurality of markings are provided on the scale of the vertical height gauge to indicate a zero reference point for at least two different selected grass treatment inserts, said zero reference point for each selected grass treatment insert being that distance where an outer periphery of the grass treatment insert mounted in a grass treatment unit is in the plane of the front and rear rollers.

4. The depth/height adjuster of claim 1 wherein the enlarged lower end of the shaft has a plurality of equally spaced vertical grooves and the frame mounting block has a spring biased plunger which is received in said vertical grooves of the enlarged lower end of the shaft for providing an audible or physical movement which may be detected by an operator rotating the shaft.

5. The depth/height adjuster of claim 1 wherein the frame mounting block and the roller mounting block has a grease fitting.

6. A depth/height adjuster for a grass treatment insert mounted to rotate in a frame supported on front and rear rollers, said depth/height adjuster adjustable to vary the distance between the frame relative to the front roller and thereby adjust the height setting of the grass treatment insert, said depth/height adjuster being symmetrical on a vertical centerline and comprising:

a frame mounting block adapted to be mounted on a left or fight side of the frame, said frame mounting block having a throughbore, an upper end of which is threaded and a lower end of which has a socket with a top and a spring biased plunger, a shaft having an upper end which is threadedly received in the threaded throughbore of the frame mounting block and an enlarged lower end which is slidingly received in the socket, said enlarged lower end of the shaft having a plurality of equally spaced vertical grooves in which the spring biased plunger is received, a roller mounting block rotatably mounted on a lower end of the shaft, whereby free rotation of the shaft in the roller mounting block and threaded rotation of the shaft in the throughbore effects the relative distance between the frame mounting block and the roller mounting block, a vertical height gauge with markings attached to the roller mounting block, which vertical height gauge when aligned with a bottom edge of the frame mounting block indicating the relative distance between the roller mounting block and frame mounting block which relative distance is correlated with a height setting of the grass treatment insert.

7. The depth/height adjuster of claim 6 wherein a marking on the vertical height gauge is provided to indicate a zero reference point for a selected grass treatment insert, said zero reference point being that distance where an outer periphery of the grass treatment insert mounted in a grass treatment unit is in the plane of the front and rear rollers.

8. The depth/height adjuster of claim 6 wherein a plurality of markings are provided on the vertical height gauge to indicate a zero reference point for at least two different selected grass treatment inserts, said zero reference point for each selected grass treatment insert being that distance where an outer periphery of the grass treatment insert mounted in a grass treatment unit is in the plane of the front and rear rollers.

* * * * *